United States Patent [19]

Bonitz et al.

[11] Patent Number: 4,700,677
[45] Date of Patent: Oct. 20, 1987

[54] ENGINE KNOCK CONTROL METHOD AND SYSTEM WITH FAIL-SAFE MODE

[75] Inventors: Jörg Bonitz, Mühlacker; Robert Entenmann, Benningen; Bernhard Miller, Stuttgart; Hans Rauch, Fürth; Siegfried Rohde, Schwieberdingen; Stefan Unland, Ludwigsburg; Walter Viess, Schwieberdingen, all of Fed. Rep. of Germany

[73] Assignee: Robert Bosch GmbH, Stuttgart, Fed. Rep. of Germany

[21] Appl. No.: 16,507

[22] Filed: Feb. 17, 1987

Related U.S. Application Data

[63] Continuation of Ser. No. 704,470, Feb. 22, 1985, abandoned.

[30] Foreign Application Priority Data

May 26, 1984 [DE] Fed. Rep. of Germany ....... 3419727

[51] Int. Cl.⁴ .............................................. F02D 5/155
[52] U.S. Cl. ...................................... 123/425; 123/416
[58] Field of Search ........................ 123/416, 417, 425

[56] References Cited

U.S. PATENT DOCUMENTS

| | | |
|---|---|---|
| 4,084,240 | 4/1978 | Lappington . |
| 4,268,910 | 5/1981 | Omori et al. ................ 123/425 X |
| 4,339,801 | 7/1982 | Hosaka et al. ................ 123/417 X |
| 4,389,994 | 6/1983 | Denz et al. . |
| 4,444,042 | 4/1984 | Bonitz et al. . |
| 4,444,172 | 4/1984 | Sellmaier et al. . |
| 4,446,723 | 5/1984 | Boning et al. . |
| 4,446,772 | 5/1984 | Boruschewitz et al. . |
| 4,452,072 | 6/1984 | Damson et al. . |
| 4,462,362 | 7/1984 | Bonitz et al. . |
| 4,466,405 | 8/1984 | Hattori et al. ................ 123/425 X |
| 4,467,634 | 8/1984 | Rohde et al. . |
| 4,483,295 | 11/1984 | Iida ..................................... 123/425 |
| 4,488,257 | 12/1984 | Hosaka . |
| 4,494,114 | 1/1985 | Kaish ............................... 340/63 X |
| 4,510,910 | 4/1985 | Ninomiya et al. .............. 123/425 X |
| 4,517,944 | 5/1985 | Inoue et al. ......................... 123/425 |
| 4,527,525 | 7/1985 | Mauermann et al. ............... 123/425 |

FOREIGN PATENT DOCUMENTS 2832594 2/1979 Fed. Rep. of Germany .

Primary Examiner—Tony M. Argenbright
Attorney, Agent, or Firm—Frishauf, Holtz, Goodman & Woodward

[57] ABSTRACT

To provide for adaptive change of the operating characteristics of an engine, so that it will operate at its optimum effectiveness, just below the knocking limit, while reliably preventing knocking thereof, a computer receives engine data from respective sensors and a knock sensor (5), from which the computer calculates, based on data stored in a memory (3), operating parameters for the engine (1). The engine is, for example, an Otto-type internal combustion engine (ICE) or a Diesel engine. The operating characteristics, as computer-modified based on sensed knocking, and the modification data, are then placed into the memory to modify the basic memory content. Preferably, the memory has a basic memory content section and a programmable differential or modification section, in which algebraic constants or modifying factors are stored, based on actual experience of operation of the engine, just under the knocking limit. Thus, the stored data on which the engine operation is controlled is continuously up-dated based on actual engine operating conditions, and thereby compensating for ageing, wear and tear of parts, different fuels, or environmental conditions or the like. The computer can likewise recognize substantial deviation of the modified characteristics from the basic characteristics and, if the modifications exceed a certain limit, provide an error or malfunction output signal to an error or malfunction output indicator (9, 4) and go into a fail-safe mode.

18 Claims, 1 Drawing Figure

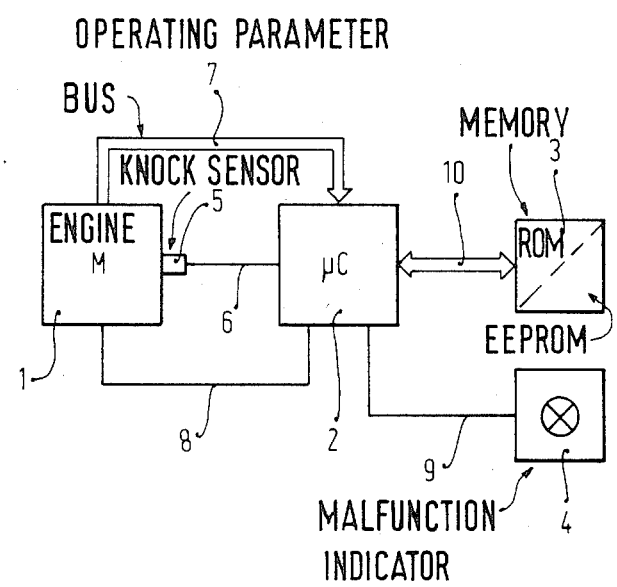

ENGINE KNOCK CONTROL METHOD AND SYSTEM WITH FAIL-SAFE MODE

This application is a continuation of application Ser. No. 704,470, filed Feb. 22, 1985, now abandoned.

Reference to related applications, the disclosures of which are hereby incorporated by reference, assigned to the assignee of the present application:

U.S. Ser. No. 692,381, filed Jan. 17, 1985, now U.S. Pat. No. 4,677,558, BOHMLER et al "Method and System for Controlling Operation of an Apparatus or Engine, particularly Internal Combustion Engine";

U.S. Ser. No. 710,171, filed Mar. 11, 1985, HENN et al "Control System for an Automotive Vehicle, particularly Engine Control System";

U.S. Ser. No. 698,318, filed Feb. 5, 1985, PRZYBYLA et al "Control System to Control Operation of an Apparatus, more particularly Operation of an Automotive Vehicle".

Reference to related patents, the disclosures of which are hereby incorporated by reference:
U.S. Pat. No. 4,389,994, DENZ et al.
U.S. Pat. No. 4,084,240, LAPPINGTON
U.S. Pat. No. 4,255,789, HARTFORD
U.S. Pat. No. 4,488,257, HOSAKA.

The present invention relates to a method and system to control the operation of an internal combustion (ICE), and more particularly to control the operation such that the engine can operate close to its knocking limit, but not under knocking conditions.

BACKGROUND

It has previously been proposed—see the referenced U.S. Pat. No. 4,389,994, DENZ et al, assigned to the assignee of the present application—to control an ICE by changing the operating conditions of the engine in the sense of changing the fuel-air mixture towards a richer mixture and/or changing the ignition timing instant by retarding the spark if knocking or a tendency to knock is being sensed. The control system there disclosed operates electronically. Control of the operation of the engine is obtained by interrogating a memory which stores characteristic data, functions or tables, or tabular fields which relate then existing operating conditions of the engine to knocking or tendency to knock, and, additionally, which relate respective operating conditions of the engines with respect to each other, such as, for example, relationships of engine temperature to loading, speed, or other operating parameters of the engine. The functions or tables interrelating the various parameters and conditions are so arranged that the engine will operate at or close to, preferably just below, knocking conditions. The operating parameter of the engine can be controlled for various desirable functional conditions, for example for maximum torque, maximum power, or optimum exhaust gas composition. Under the desired operating condition, then, the engine should be operated close to the knocking limit thereof.

The data relating to the characteristics of the engine, that is, which relate the respective operating conditions to knocking, for example, or the operating conditions with respect to each other, just under the knocking limit, are usually derived empirically, supplied by the manufacturer of the engine, and are obtained by running the engine under experimental conditions on an engine test stand. In use, and as the engine wears, components age, or are changed, valves and their adjustment change, the fuel quality changes and differs from that under which the tests were made, it is possible that the actual operating conditions or functional relationships under which the engine will operate at a given time will no longer match those from the engine under test, and on which the functional relationships and tables are based. Air pressure, ambient humidity and the like further can change the operating conditions of the engine. Consequently, the tabular data on which the functional relationships are based, and which are stored in a memory, typically a read-only memory (ROM), no longer may fit the engine, and are less than ideally suited to its control.

THE INVENTION

It is an object to provide a control system in which control parameters for controlling operation of the engine, just under the knocking limit, will fit the actual conditions of the engine.

Briefly, an adaptive control system and method is provided so that the knocking control can be matched to the actual operating conditions and parameters of the engine as they exist at the time that the control system is operative, and the control method is being carried out. In accordance with a feature of the invention, the memory of the system has operating data entered thereinto representative of prior functional relationships of operating conditions of the engine, and resulting knocking or non-knocking operation thereof, the so entered data modifying the stored functional relationships of the data stored previously in the memory. Consequently, the functional relationships are continuously up-dated, based on, for example, changes in the engine itself due to ageing, wear and tear, and the like, as well as changes based on then existing operating conditions, such as ambient air pressure and humidity, fuel quality and composition and the like.

The system and method has the advantage that an adaptively changeable functional relationship is obtained, the content of which will depend on the then existing operating parameters, adapted in accordance with prior operating experiences. The knocking control can then be matched to various operating conditions, automatically, thus substantially decreasing the tendency of the engine to knock, or its knocking itself. This is particularly advantageous if the engine is started cold, upon transition from extended high-speed interstate driving to local road driving, urban traffic and the like.

Varying the functional characteristics can be carried out, particularly simply, in accordance with a preferred feature of the invention, by providing a basic functional relationship, stored in the memory, and adding, or multiplying therewith, correction factors, for example by adding a changeable differential functional relationship. Adaptation of the knock system, in accordance with this feature of the invention, then can be carried out with respect to various operating parameters merely by varying the difference or modification field portion of the memory. Not only then existing operating parameters, but also past experience, that is, operating parameters which previously were sensed and modified the operating characteristic functions can be used; this then opens the possibility to monitor not only the operation of the engine, but, further, the operation of the knock sensor itself.

Adaptive change of characteristics in dependence on knocking of the ICE results in a substantial decrease in the frequency of knocking of the engine during operation, without, however, changing the operating characteristics to such an extent that the engine operates under less than ideal conditions, that is, far from the knocking limit. It is also possible, in accordance with a feature of the invention, to check if the modified functional characteristics deviate from a standard form of the function by an extent in excess of a predetermined limit, to indicate, for example, that erroneous data are being received or that data are erroneously stored and/or processed, and, under such conditions, to provide a malfunction output indication. Upon recognition of an error or malfunction, it is then readily possible to utilize a fixed functional characteristic, stored in the memory, or to load the memory with such a fixed characteristic which is so arranged and dimensioned that the ICE will continue to operate, possibly not at its most efficient or best level, but such that no possibility of danger or damage thereto may result, that is, to continue operation of the engine under conditions which, assuredly, will not cause knocking. This operation may continue until the malfunction is eliminated, for example by repair.

DRAWINGS

The FIGURE illustrates, schematically, an internal combustion engine knocking control system in accordance with the invention, and which will be utilized to explain the method of the present invention.

DETAILED DESCRIPTION

An engine 1 which, in the example, is an Otto-type internal combustion engine of an automotive vehicle—although it could be another type of engine—has transducers attached thereto which provide output signals applied over an operating parameter bus 7 to a computer or microprocessor 2. The signals represent such parameters of the engine as speed, loading on the engine, temperature thereof, and the like. The engine, further, has a knock sensor 5 applied thereto, of any suitable and standard construction, which provides output signals over a knock sensing line 6 to the computer 2. The knock sensor is responsive, for example, to vibration of the engine which occurs under knocking conditions. Circuitry to select knocking signals from non-knocking signals is not shown in the present application since various systems and arrangements therefor are well known and described in the relevant literature.

The computer 2 delivers control output signals over a bus 8 which influences an operating condition of the engine capable of controlling knocking, for example change of the ignition instant towards retardation. The microprocessor or computer 2 includes or has connected thereto a memory 3, typically a RAM and/or a ROM, coupled to the computer 2 by a bus 10. The ROM stores characteristic operating functions of the engine, relating, for example, temperature, loading, speed and the like, and ignition instant, such that the engine will operate under a selected optimum condition, for example maximum power, maximum economy or the like. The bus 10, as shown by the dual arrows, is capable of transmitting data in either direction, to provide for exchange of data between the computer 2 and the memory 3. The computer 2 has an additional output at line 9 which is connected to a malfunction indicator 4.

The computer 2, essentially, is formed by a microprocessor and includes the customary electronic circuitry, and, preferably, also the electronic circuitry to evaluate signals on line 6 from the knock sensor 5. It preferably also includes the respective interfaces, input circuits, driver circuits, and the like, necessary for operation of positioning elements and output units coupled to bus 8, as well as amplifiers and the like, analog/digital converters, and the reverse, for data received on the operating parameter bus 7. It also includes the necessary interface and processing circuitry to process data interchanged with the memory 3 on bus 10. The computer may be any well known computer, as described in the literature, used to control and monitor the operation of an engine, including adjustment thereof to appropriate operating and environmental conditions, as well as for monitoring and supervision of other components within an automotive vehicle, for example brakes, gear shifting and the like. Knock sensing data derived from knock sensor 5 and transmitted over the line 6 can be evaluated in accordance with various methods, one of them being described in German Patent Publication DE-OS No. 28 32 594, and corresponding U.S. Pat. No. 4,153,020. The system and method of evaluating the output from the sensor 5, in accordance with the described method, or any other one well known in the art, results in output signals which define a yes/no decision characterizing knocking or non-knocking operation of the engine respectively. The computer 2, upon receiving an appropriate signal on line 6, can then change an operating parameter, in the example selected the ignition timing, in fixed steps, or variable steps, as desired, for example based on one degree steps of crankshaft rotation of ignition advance, for either advancing or retarding the ignition, depending upon whether the engine knocks, has a tendency to knock, or is operating under non-knocking conditions and should be brought closer to the knocking level. Additionally, some known systems permit recognition of the degree of knocking intensity, so that the adjustment steps for ignition timing can be appropriately matched to the operating state of the engine at the time, for example, if the knocking is intense, by changing ignition timing in a retardation sense to a greater extent than if a tendency, or incipient knocking, only, is sensed.

The memory 3 is shown separately from the computer 2 merely for purposes of illustration; part of the memory 3 is a read-only memory (ROM) which stores, for example, basic functional characteristics and data, for example in tabular or graph form, as well known, in digital arrangement; additionally, the memory 3 has a random access memory (RAM) portion which, for example, upon starting of the engine 1, that is, upon connection of supply voltage, is loaded with basic data, derived for example from the ROM portion thereof within the memory 3. The RAM portion of the memory 3 then stores a table, in digital form, or a functional relationship which can be expressed in tabular or graphic form, in which, for example, the ignition timing advance angle is related to two dimensions, speed and load. The basic functional relationship, that is, the basic table, can be derived by the engine manufacturer in laboratory tests, from a test stand, and thus contain optimum operating data, for example to provide maximum power output, minimum fuel consumption, or the like. If the engine is cold, a different basic operating functional relationship is necessary. The basic characteristic or field which is loaded in the RAM of the memory 3 then can be different from that of similar data when the engine is warm. Various operating conditions, such as under cold starting, or warm starting conditions can be considered. For ease of programming, and improved operating reliability, it is desirable to form a modified characteristic field by first starting with a basic characteristic or functional relationship, and then modifying the characteristic data thereof with a difference functional relationship, or a difference data field. The difference data field may be the only one which is changeable, so that, as will appear in the subsequent description, only the difference field, or the difference in the functional relationship need be influenced or modified. Other functional interrelationships may also be used, for example rather than additive to use a multiplicative change, in order to obtain the actual characteristic which is to control the engine, modified from the basic one provided, for example, by the manufacturer of the engine.

During operation of the ICE, the functional relationship is analyzed with respect to various criteria, based on various functional curves or relationships, for example in dependence on the parameter or working point to be considered—such as speed, loading, temperature, and the like. The microcomputer 2 will then calculate, based on the then existing operating point, what the ignition timing instant should be, by retrieving from the memory 3 the respective values relating ignition timing to the parameter then considered. This ignition timing may be delayed by a predetermined time period which tends to retard the spark, derived from the knock sensor, or on the knock sensing line 6, if the knock sensor 5 responds with a "yes" knocking signal. If so, the then existing operating point—in the example the ignition instant—is changed or delayed in the direction of greater distance from knocking operation of the engine. Recognition that the ignition instant, as recalled from the memory, resulted in knocking in an indication that the functional relationship stored in the memory resulted in knocking operation of the engine.

If, upon a change in operating conditions, and elapse of some time of operation of the engine under such changed conditions, no knocking is sensed by the knock sensor 5 and transmitted over line 6 to the computer, the computer will, automatically, increment the functional relationships, under which it controls ignition timing, in the direction of ignition advance, which brings the operation of the engine closer to the knocking limit. Such change, preferably, is carried out after a predetermined number of combustion cycles, sufficient, in the light of the overall inertia of the engine, to establish normal running conditions, that is, free from transients. The change of ignition timing, closer towards the knocking limit, may be in steps, for example by one degree crankshaft angle, or any other suitable steps. Advancing ignition timing, thus, changes the operating condition towards an optimum which is as close to knocking as possible.

The analysis of the characteristic fields or tables may be done, thus, in dependence on engine speed. The changes will be faster when there are abrupt changes in loading, and at high engine temperature.

All the foregoing changes occur during various operating states of the engine, based on different curves, and functional relations within the characteristic field of storage of the memory 3. The result will be an adaptive approximation of the ignition timing in the memory 3 with respect to all operating conditions, that is, within the entire operating range or scope of the engine, to optimal operating conditions, while maintaining only minimum distance from knocking operation.

The sensing of knocking can be specific to the respective cylinders of a multi-cylinder ICE. For example, in a four-cylinder ICE, the characteristic functional relationships stored in the memory 3 will be specific for each cylinder, and provide four ignition angle outputs, at given speed and loading, for example. The content of the memory 3 thus provides for basic data and modification or differential modification data which, themselves, adapt to the respective knock limit of the respective cylinders. The operation of the ICE thus will be carried out under dynamic conditions, and will be able to accommodate various changes in operation, particularly, for example, accelerating conditions. Even under accelerating conditions, knocking is reliably prevented while, at the same time, operation close to the optimum operating condition of the engine is insured.

Malfunction of components within the system, as described, or erroneous operation of the engine, will be recognized by deformation of the characteristics which are being changed in previously known typical form. The computer 2, easily, can carry out a continuous comparison of the form of the characteristic functions entered into the storage fields with predetermined upper and lower limiting values. For example: Let it be supposed that the connecting line 6 between the knock sensor 5 and the computer 2 is broken, or that the knock sensor 5 becomes so defective that it will not provide a knocking output signal. The adaptive system will, then, for the specific cylinder change the ignition timing more and more toward spark advance—which, if the knock sensor would be operative, would result in knocking signals—which can be recognized since the operating characteristics for this cylinder, as represented in functional, graphic or tabular form stored in the memory 3, will approach, adaptively, earlier and earlier ignition angles or ignition instants, and, quickly, reach an ignition timing angle or instant which would be inappropriate for engine operation under normal conditions. By recognizing when a certain limit—which should be set for prohibited engine operating conditions—is reached, malfunction can be recognized, and indicated over line 9 to provide a malfunction output indication by the indicator 4. Other examples which may result in changes in the operating functions of the engine are leaking valves, dirty spark plugs, contaminated for instance by oil, leaking piston rings and the like. Various well known abnormal operating conditions will result in abnormal functional relationships between ignition angle and the respective engine operating parameters, which are typical for particular defects or abnormal operations and can be readily recognized. The computer 2, by carrying out simple comparisons, recognizes such abnormal conditions and provides an error or malfunction output to the malfunction indicator 4 over line 9. Depending on the structural arrangement of the vehicle, the display 9 may merely provide an optical or acoustic output to warn the operator that something is amiss in the system; the malfunction indicator 4 may, additionally, provide speech-synthesized output which, by recognizing a specific typical abnormality in the change of the functional relationship, can be specific to the error.

If malfunction is detected, the engine might operate under knocking conditions leading to damage and, possibly, even destruction thereof. In order to prevent damage to the engine, the ignition timing control is switched over from the adaptive characteristic to a fail-safe characteristic field or table which will control the engine to, reliably, operate in a range which will not lead to damage, that is, a safety field which is loaded into the RAM from the ROM portion of the memory. Knock sensing and control of the engine operation by the knock sensor may then be interrupted, thus insuring continued operation of the ICE under any possible operating conditions although the optimum operating conditions may not be reached.

The computer 2 can readily test for presence of background noise output from the knock sensor 5, by electronically evaluating the signals applied from line 6. If background noise is sensed, the malfunction is not within the sensor 5 and/or the line 6. Functional monitoring is further possible with respect to individual cylinders of a multi-cylinder ICE, and of the specific knock sensors of the cylinders by checking deviation of specific ignition angles of any one cylinder from the ignition timing angle of all the cylinders. If the difference of ignition timing of any one cylinder deviates from an averaged or weighted value associated with all the cylinders by a predetermined limit, an error can be deemed to have occurred and can be suitably indicated on the malfunction indicator 4.

Various changes and modifications may be made, and the invention is not limited to the example specifically described, which has been directed to sensing of engine knocking and applying the signals directly to the computer 2. Specifically, the type of knock evaluation will depend on the knock sensor 5, and the type of knock evaluation signals will depend on the system selected. Likewise, the steepness of adjustment steps, the timing and spacing of adjustment steps of ignition advance or retardation, respectively, will depend on the selected system. The dimension and density of the characteristic field or functional field within the memory 3 will depend on the fineness of control desired, and the type of engine, and is within the judgment of the respective engineer, based on compromises of computer characteristics, speed, and memory capacity, as well as costs. It is well known to store a predetermined minimum number of data and provide intermediate values by interpolation, which may be obtained by referring to various specific tabular values, or graph points, for example. In one example, 16×16 graph points may be obtained fictitiously by interpolating between a substantially lesser number of data points which relate load and speed to ignition timing. The gap or distance between actual engine operation and engine operation just at the knocking limit can thus be adaptively controlled by recourse and read-out of data from the characteristic field stored in the memory 3. The extent of operation just under or clearly below knocking condition will, likewise, depend on the engine, and on the design compromises which must be made, relating operating comfort of the vehicle in which the engine is installed, engine size and strength, durability, and other factors to engine operation, and distancing of the operation from knocking conditions.

Preferably, the adaptive field is stored in an electronically erasable programmable read-only memory (EEPROM) or in an NVRAM (non-volatile random access memory), so that modification or differential data derived from adaptive sensing and storage of actual operating conditions will be stored within the memory, even after the engine is shut off, and the main switch disconnected. For example, if the engine is operated for some time so that it will be warm, then stopped, and to be started again, the high engine temperature can be used to transfer the reading of stored data by the computer 2 directly to the modified functional relationships or data stored in the EEPROM section of the memory rather than operating the engine based on its basic functional characteristics, which, otherwise, would have been recalled by the computer 2 from the basic functional tables. When using an EEPROM, it is also possible to read the stored data by connecting a suitable reading unit, for example in a service station of the manufacturer, and connect the thus read-out data to a diagnostic computer to provide engine characteristics and operating data diagnosis, for example for purposes of adjustment or repair.

The invention has been described with reference to an Otto-type internal combustion engine, and the ignition timing angle referred to hereinabove relates to the spark timing. The invention is equally applicable, however, to Diesel engines, in which engine knocking may also occur. Optimum operation of a Diesel engine is insured by controlling the fuel injection timing such that it occurs just before the engine might knock; under knocking conditions, injection timing can be delayed. If an internal combustion engine—regardless of whether of the Otto type or of the Diesel type—is used with a turbocharger, it is possible to change the operating conditions of the engine in a direction to decrease, for example, knocking by lowering the supercharge or turbocharge pressure. Pressure changes can be obtained, for example, by speed changes of the turbocharger and/or bypassing charging air from the intake manifold of the engine.

We claim:

1. Method of controlling operation of an internal combustion engine (ICE) (1) close to the knocking level of the engine, utilizing a computer (2);

means (7) providing sensed operating parameter values from said engine (1) to said computer (2);

a knock sensor (5) providing knock signals, to the computer, which have characteristics which differ in dependence on weather the engine operates under knocking or non-knocking conditions;

a programmable memory (3), having at least a non-volatile memory section, coupled to the computer, the memory storing data representing functional relationships of operating parameters of the engine with respect to the then-pertaining operating conditions thereof, the computer (2) receiving data, from the memory (3), relating the operating parameters of the engine to then-pertaining operating conditions and providing output control signals (8), to the engine based on data from the memory to set the operating parameters such that the engine will be operating under optimum, but non-knocking, conditions, comprising the steps of providing in the memory a basic functional relationship of operating parameters of the engine with respect to a set of operating conditions thereof;

determining, in said computer, based on operating experience, which control settings result in knocking, and thus where, along a range of control settings, a knocking limit lies, recording in the non-volatile section of the memory (3) adapting up-dating data which represents functional relationships associating operating parameters control setting values, under then-pertaining engine operating conditions, with engine operation just short of said knocking limit;

providing limiting values for modification of the stored functional relationships of the data in the memory;

testing whether said up-dating data have values within said limiting values and, if so, using said up-dating data to modify the functional relationship data stored in the memory, and, if not, providing a malfunction indication (9, 4);

looking up in the non-volatile section of said memory (3), based on sensed operating parameter values, the thus-modified control setting data associated with operation short of the knocking limit, and then controlling the operating parameters of the engine in accordance with, selectively, said basic functional relationship or said modified functional relationship data, depending upon whether said malfunction indication is present or not.

2. Method according to claim 1, wherein the memory (3) stores a set of data representing basic functional relationships of operating parameters of the engine with respect to operating conditions;

including the step of storing, in a difference memory field, difference data modifying said basic data;

and modifying said basic data by the difference data by a mathematical operation in the computer (2).

3. Method according to claim 2, wherein the mathematical operation comprises addition to the basic data of a constant forming the difference data.

4. Method according to claim 2, wherein the mathematical operation comprises multiplication of the basic data by a difference factor.

5. Method according to claim 2, wherein the mathematical operation comprises addition to the basic data of a constant forming the difference data, and multiplication of the basic data by a difference factor.

6. Method according to claim 1, wherein the step of modifying the stored functional relationship comprises modifying the data representative of the functional relationship of at least one previously controlled operating parameter so that the content of the memory will depend on at least one operating parameter on which a prior operation of the engine was based.

7. Method according to claim 1, including the step of recognizing knocking conditions;

and the step of modifying the stored functional relationships comprises changing the data stored in the memory representative of the then pertaining functional relationship in a direction to operate the engine under non-knocking conditions;

monitoring the signals from the knocking sensor and determining when knocking operation of the engine has ceased;

and further modifying the stored functional relationships in a direction towards knocking of the engine, in steps.

8. Method according to claim 7, wherein the change in operating parameter of the engine upon sensing that the engine operates in knocking condition, towards non-knocking operation, is greater than the steps based on the further modification, upon return of the change in operating condition in a direction towards knocking operation.

9. Method according to claim 7, wherein at least one of:
extent of step;
rate of steps are based on at least one operating parameter of the engine.

10. Method according to claim 9, wherein said at least one operating parameter of the engine comprises speed.

11. Method according to claim 7, including the step of sensing at least one of: intensity of knocking signals below a predetermined limit; absence of any knocking signals from the knock sensor; repetition rate of knocking signals from the sensor below a predetermined limit;

and including the step of inhibiting up-dating of the data, and modification of the stored functional relationships upon sensing of any of the foregoing conditions.

12. System for adaptive, optimum control of an internal combustion engine comprising a computer (2);

means (7) providing sensed operating parameter values from said engine (1) to said computer (2);

a knock sensor (5) coupled to the engine (1) and providing signals, to the computer, which have characteristics which differ in dependence on whether the engine operates under knocking or non-knocking conditions;

a malfunction indicator (9, 4);

a programmable memory (3) coupled to the computer, the memory storing data representing functional relationships of operating parameter control settings of the engine with respect to sensed operating conditions thereof, the computer (2) receiving, data from the memory (3), relating operating parameters of the engine to then-pertaining operating conditions, and providing output control setting signals (8) to the engine, based on data from the memory, to change the operation of the engine in a direction so that the engine will operate under optimum, non-knocking, conditions, wherein, in accordance with the invention, the memory (3) has at least a non-volatile memory section and a fixed memory section and is coupled to the computer to receive updating data from the computer representative of prior functional relationships of operating parameters of the engine short of knocking operation thereof, with respect to then-pertaining operating conditions, the computer (2) determines, based on said knock signals and on input signals representing sensed operating parameter values, which output control setting signals result in knocking operation and which result in operation short of a knocking limit and modifies the functional relationship data stored in said memory by recording updating data in the non-volatile section thereof, and further determines whether a malfunction is present, and said non-volatile programmable section of the memory, thereafter, provides modified control setting data to the computer, as a function of said sensed operating parameter values, until a malfunction is detected, in which case said fixed memory section provides control setting data.

13. System according to claim 12, wherein the memory contains a basic memory section (ROM) containing basic functional relationships relating operating parameters of the engine with respect to expected operating conditions;

and a programmable difference section (EEPROM) containing modification data based on data derived from the computer (2) and relating operating parameters of the engine to actually pertaining operating conditions thereof under conditions just short of knocking operation.

14. System according to claim 12, wherein the programmable memory includes a difference portion, for algebraically modifying the basic memory content of the basic memory (ROM) in accordance with the actual operating parameters of the engine under conditions of then pertaining actual operation just below the knocking limit of the engine.

15. System according to claim 14, wherein the difference portion of the programmable memory contains at least one of: algebraically additive constants; multiplicatively applicable factors.

16. System according to claim 12, wherein the programmable memory contains at least one of: algebraically additive constants; multiplicatively applicable factors.

17. System according to claim 12, wherein
the computer senses limiting values of change of said operating parameters;
said system further including a malfunction output and indicator (9, 4) and providing a malfunction output if the modification or change of the operating parameter exceeds a predetermined limit.

18. System according to claim 13, wherein the computer senses limiting values of change to said operating parameters;
said system further including a malfunction output and indicator (9, 4) and providing a malfunction output if the modification or change of the operating parameter exceeds a predetermined limit;
and wherein the difference portion of the programmable memory contains at least one of: algebraically additive constants; multiplicatively applicable factors.

* * * * *